United States Patent [19]
Tozaki et al.

[11] Patent Number: 5,886,965
[45] Date of Patent: Mar. 23, 1999

[54] INFORMATION RECORDING APPARATUS, INFORMATION RECORDING MEDIUM, AND INFORMATION REPRODUCTION APPARATUS USING CONTENTS INFORMATION SIGNAL

[75] Inventors: Akihiro Tozaki, Tsurugashima; Takao Sawabe, Tokyo-to, both of Japan

[73] Assignee: Pioneer Electronic Corporation, Tokyo-to, Japan

[21] Appl. No.: 670,533

[22] Filed: Jun. 27, 1996

[30] Foreign Application Priority Data

Jun. 30, 1995  [JP]  Japan ................................. 7-166024

[51] Int. Cl.[6] ...................................... G11G 7/00
[52] U.S. Cl. .............................. 369/47; 369/48
[58] Field of Search ................... 369/58, 54, 47, 369/48, 275.3, 49; 84/609, 610, 601, 645

[56] References Cited

U.S. PATENT DOCUMENTS

| | | | |
|---|---|---|---|
| 5,245,600 | 9/1993 | Yamauchi et al. | 369/49 |
| 5,466,883 | 11/1995 | Miyashita et al. | 84/610 |
| 5,537,387 | 7/1996 | Ando et al. | 369/58 |
| 5,561,649 | 10/1996 | Lee et al. | 369/47 |
| 5,608,697 | 3/1997 | De Haan et al. | 369/58 |
| 5,609,486 | 3/1997 | Miyashita et al. | 84/610 |
| 5,612,943 | 3/1997 | Moses et al. | 369/48 |
| 5,617,384 | 4/1997 | Yonemitsu et al. | 369/48 |
| 5,633,841 | 5/1997 | Yokota et al. | 369/58 |
| 5,634,031 | 5/1997 | Sakuma | 369/48 |
| 5,679,911 | 10/1997 | Moriyama et al. | 84/601 |

*Primary Examiner*—Thang V. Tran
*Attorney, Agent, or Firm*—Morgan, Lewis & Bockius LLP

[57] ABSTRACT

A recording medium includes a first area for recording a signal including a plurality of units; and a second area for recording a contents information signal relating to a the plurality of units. The contents information signal includes relative position signals of the units and category signals indicative of the categories of the units classified in a predetermined classification manner. An reproduction apparatus includes a reading device for reading the processed signal and the contents information signal from the recording medium; an extracting device for extracting the relative position signals and the category signals from the contents information signal; an instruction device for receiving an instruction which designates the classified category; a control device for detecting the units corresponding to the category designated by the instruction by referring to the category signals and for detecting the relative position signals corresponding to the detected units; and a reproduction device for reproducing the units of the processed signal from the position detected by the control device.

19 Claims, 9 Drawing Sheets

FIG. 3

| CATEGORY CODE | CLASSIFIED CATEGORY |
|---|---|
| 00h | NO CLASSIFICATION |
| 01h | INTRODUCTION |
| 02h | MID-SONG |
| 03h | CLIMAX |
| 04h | INTERLUDE |
| 05h | ENDING |
| 06h | RESERVED |
| ⋮ | ⋮ |
| FFh | RESERVED |

| | CONTENTS | BYTES |
|---|---|---|
| 20 | TOTAL SONG NUMBER (m) | 1 BYTE |
| 21 | NUMBER OF LARGE UNITS IN SONG No.1 ($n_1$) | 1 BYTE |
| 21 | NUMBER OF LARGE UNITS IN SONG No.2 ($n_2$) | 1 BYTE |
| 21 | --- | --- |
| 21 | NUMBER OF LARGE UNITS IN SONG No.m ($n_m$) | 1 BYTE |
| 22 | NUMBER OF SMALL UNITS IN LARGE UNIT No.1 ($k_1$) | 1 BYTE |
| 22 | NUMBER OF SMALL UNITS IN LARGE UNIT No.2 ($k_2$) | 1 BYTE |
| 22 | --- | --- |
| 22 | NUMBER OF SMALL UNITS IN LARGE UNIT No.x ($k_x$) | 1 BYTE |
| 23 | No. OF SMALL UNIT No.1 | 2 BYTES × $k_1$ |
| 23 | No. OF SMALL UNIT No.2 | 2 BYTES × $k_2$ |
| 23 | --- | --- |
| 23 | No. OF SMALL UNIT No.y | 2 BYTES × $k_x$ |
| 24 | START ADDRESS OF SMALL UNIT No.1 | 4 BYTES |
| 24 | START ADDRESS OF SMALL UNIT No.2 | 4 BYTES |
| 24 | --- | --- |
| 24 | START ADDRESS OF SMALL UNIT No.y | 4 BYTES |
| 25 | CONTENTS CODE OF SMALL UNIT No.1 | 1 BYTE |
| 25 | CONTENTS CODE OF SMALL UNIT No.2 | 1 BYTE |
| 25 | --- | --- |
| 25 | CONTENTS CODE OF SMALL UNIT No.y | 1 BYTE |

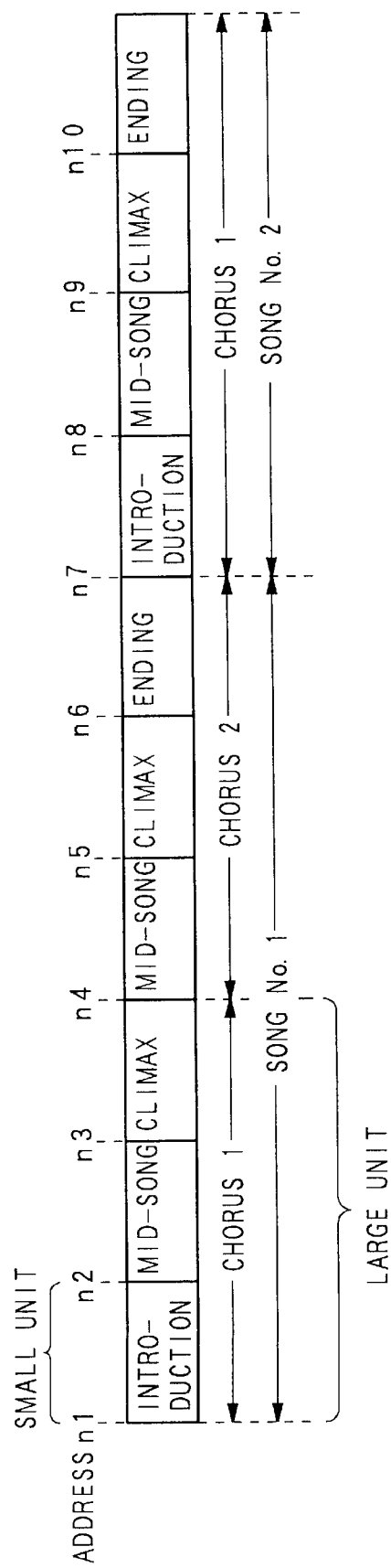

| | CONTENTS | VALUE |
|---|---|---|
| 20 | TOTAL SONG NUMBER | 2 |
| 21 | NUMBER OF LARGE UNITS IN SONG No. 1 | 2 |
| 21 | NUMBER OF LARGE UNITS IN SONG No. 2 | 1 |
| 22 | NUMBER OF SMALL UNITS IN LARGE UNIT No.1 | 3 |
| 22 | NUMBER OF SMALL UNITS IN LARGE UNIT No.2 | 3 |
| 22 | NUMBER OF SMALL UNITS IN LARGE UNIT No.3 | 4 |
| 23 | No. OF SMALL UNIT No. 1 | 1 |
| 23 | | 2 |
| 23 | | 3 |
| 23 | No. OF SMALL UNIT No. 2 | 4 |
| 23 | | 5 |
| 23 | | 6 |
| 23 | No. OF SMALL UNIT No. 3 | 7 |
| 23 | | 8 |
| 23 | | 9 |
| 23 | | 10 |
| 24 | START ADDRESS OF SMALL UNIT No. 1 | n1 |
| 24 | START ADDRESS OF SMALL UNIT No. 2 | n2 |
| 24 | START ADDRESS OF SMALL UNIT No. 3 | n3 |
| 24 | START ADDRESS OF SMALL UNIT No. 4 | n4 |
| 24 | START ADDRESS OF SMALL UNIT No. 5 | n5 |
| 24 | START ADDRESS OF SMALL UNIT No. 6 | n6 |
| 24 | START ADDRESS OF SMALL UNIT No. 7 | n7 |
| 24 | START ADDRESS OF SMALL UNIT No. 8 | n8 |
| 24 | START ADDRESS OF SMALL UNIT No. 9 | n9 |
| 24 | START ADDRESS OF SMALL UNIT No.10 | n10 |
| 25 | CONTENTS CODE OF SMALL UNIT No. 1 | 01h |
| 25 | CONTENTS CODE OF SMALL UNIT No. 2 | 02h |
| 25 | CONTENTS CODE OF SMALL UNIT No. 3 | 03h |
| 25 | CONTENTS CODE OF SMALL UNIT No. 4 | 02h |
| 25 | CONTENTS CODE OF SMALL UNIT No. 5 | 03h |
| 25 | CONTENTS CODE OF SMALL UNIT No. 6 | 05h |
| 25 | CONTENTS CODE OF SMALL UNIT No. 7 | 01h |
| 25 | CONTENTS CODE OF SMALL UNIT No. 8 | 02h |
| 25 | CONTENTS CODE OF SMALL UNIT No. 9 | 03h |
| 25 | CONTENTS CODE OF SMALL UNIT No.10 | 05h |

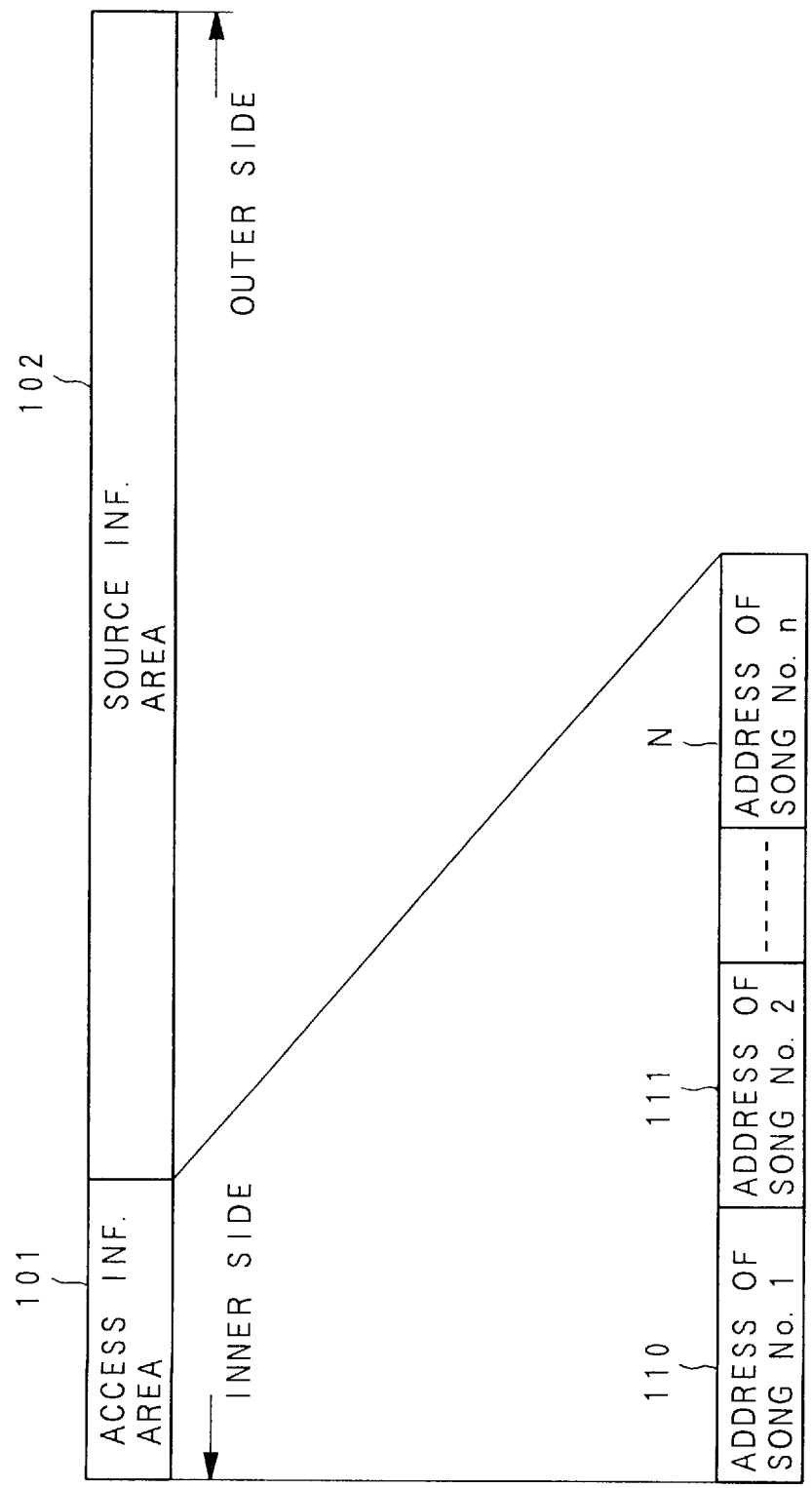

INFORMATION RECORDING APPARATUS, INFORMATION RECORDING MEDIUM, AND INFORMATION REPRODUCTION APPARATUS USING CONTENTS INFORMATION SIGNAL

BACKGROUND OF THE INVENTION

1. Field of the Invention

The present invention relates to an information recording medium, an information recording apparatus, and an information reproduction apparatus. More particularly, the present invention relates to an information recording medium such as an optical disk, an information recording apparatus for recording information on the recording medium, and an information reproduction apparatus for reproducing information from the recording medium in a desired way, regardless of the recording order on the recording medium.

2. Description of the Prior Art

Recently, there are broadly prevailed, as an information recording medium for recording information such as audio information, a Compact Disk, an audio tape and a Digital Audio Tape. Further, a Laser Disk, a Video Tape, a CD-V (Compact Disk-Video) and a Video Compact Disk are also broadly known as an information recording medium on which not only audio information but video information are recorded. Using these information recording media, Recorded information may be reproduced in various patterns (random access reproduction), irrespective of the recording order of the information pieces on the recording medium. For example, in the case of CD, many songs can be reproduced in a reversed order, and only a certain song can be repeatedly reproduced. Further, recorded information may be reproduced in accordance with time information (time code) recorded on the recording medium together with recorded information.

In a case of the conventional CD, as shown in FIG. 9, an access information area 101 is formed at inner circumferential side of the source information area 102 where source information such as audio information are recorded, so that the random access reproduction can be performed. In the access information area 101, access information used for reproduction are recorded for every songs. Further, the access information area 101 is recorded with start addresses 110, 111, . . . , N indicative of the addresses of the head portions of the respective songs recorded in the source information area 102, as shown in FIG. 9. Therefore, in the case of the conventional CD, the recorded song can be reproduced only by units of the songs. Nowadays, the information recording medium is used for karaoke playing, and in the karaoke use, there are desires to repeatedly reproduce only a certain portion of a song, such as a climax part, and to reproduce only certain portions of the plural songs, such as only the introduction part of many songs. However, since address information is recorded by the units of the songs in the conventional CD, the above demands can not be satisfied.

SUMMARY OF THE INVENTION

It is an object of the present invention to provide an information recording medium, and recording and reproduction apparatuses for the same, by which desired portions of the songs can be reproduced, not by the unit of song, in various reproduction manner such as the random access reproduction.

According to one aspect of the present invention, there is provided an information recording apparatus including: a signal processing device for receiving signal to be recorded and applying a predetermined processing onto the received signal to output a processed signal; a contents information signal generating device for generating a contents information signal relating to a plurality of units of the processed signal, the contents information signal including relative position signals of the units with respect to the processed signal and category signals of the units classified in a predetermined classification manner; an adding device for adding the contents information signal to the processed signal to output a complex signal; and a recording device for recording the complex signal on a recording medium.

In accordance with the apparatus thus configured, a signal to be recorded is received and is applied a predetermined processing to output a processed signal. A contents information signal relating to a plurality of units of the processed signal is generated. The contents information signal includes relative position signals of the units and category signals of the units classified in a predetermined classification manner. Then, the contents information signal is added to the processed signal to output a complex signal, and the complex signal is recorded on a recording medium.

According to another aspect of the present invention, there is provided a recording medium including: a first area for recording a signal processed by a predetermined signal processing, the signal including a plurality of units; and a second area for recording a contents information signal relating to a the plurality of units, the contents information signal including relative position signals of the units with respect to the processed signal and category signals indicative of the categories of the units classified in a predetermined classification manner.

According to still another aspect of the present invention, there is provided an information reproduction apparatus for reproducing signals from the above recording medium including: a reading device for reading the processed signal and the contents information signal from the recording medium; an extracting device for extracting the relative position signals and the category signals from the contents information signal; an instruction device for receiving an instruction which designates the classified category; a control device for detecting the units corresponding to the category designated by the instruction device by referring to the category signals and for detecting the relative position signals corresponding to the detected units; and a reproduction device for reproducing the units of the processed signal from the position detected by the control device.

In accordance with the apparatus thus configured, the processed signal and the contents information signal are read out from the recording medium, and the relative position signals and the category signals are extracted from the contents information signal. The instruction device receives an instruction which designates the classified category. Then, the units corresponding to the category designated by the instruction device are detected by referring to the category signals, and the relative position signals corresponding to the detected units are also detected. Thereafter, the units of the processed signal designated by the instruction device are reproduced from the position detected by the control device.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 3 shows an example of definition of category codes;

FIG. 4 shows a data structure of access information;

FIG. 5 shows an example of the classification of the units of songs;

FIG. 6 shows an example of access information;

FIG. 9 shows the information recording manner of the conventional CD.

DETAILED DESCRIPTION OF THE PREFERRED EMBODIMENTS

The preferred embodiments of the present invention will now be described below with reference to the attached drawings. It is noted that the following embodiments are directed to an information recording apparatus for recording information on an optical disk serving as an information recording medium and to an information reproducing apparatus for reproducing information from the optical disk.

(1) Information recording apparatus

Figure 1:
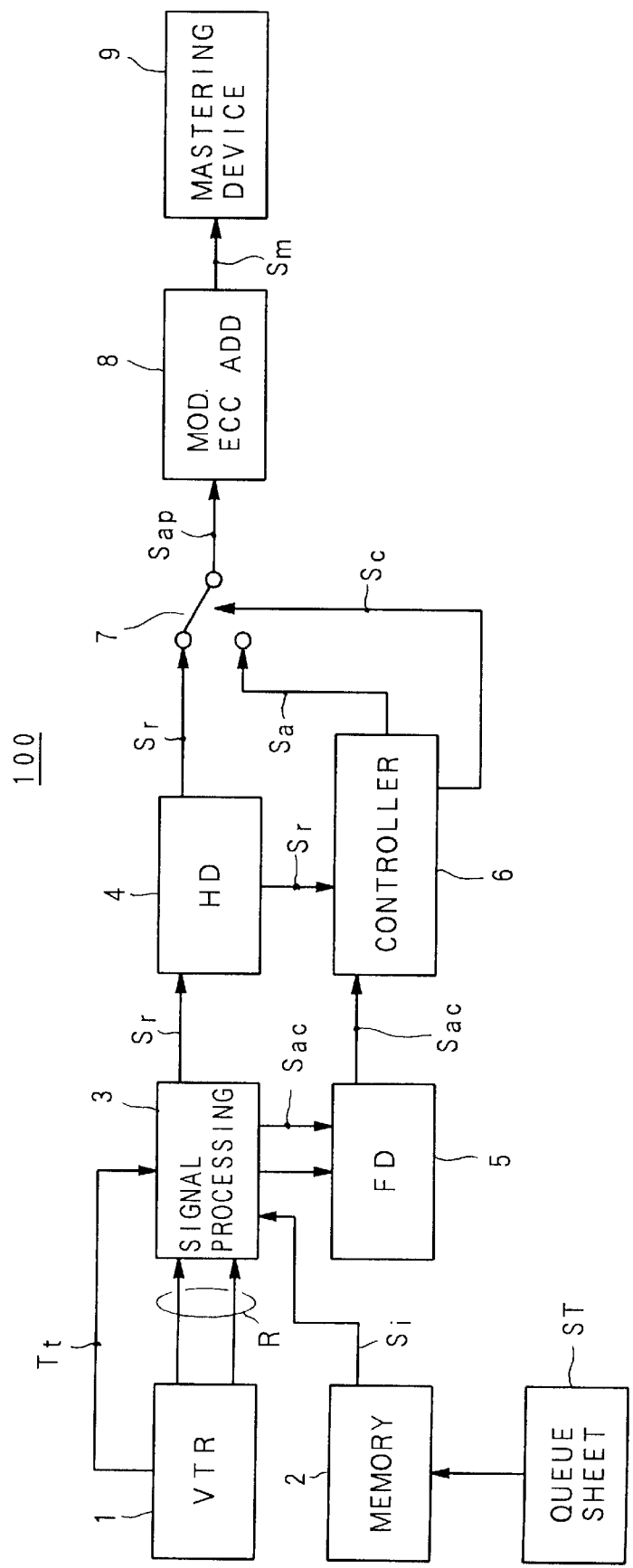
FIG.1 is a block diagram illustrating the configuration of the information recording medium according to the present invention.

First, the description will be given of the configuration and the operation of the information recording apparatus and the optical disk serving as the information recording medium. First, the configuration of the information recording apparatus will be described. As shown in FIG. 1, the information recording apparatus 100 of the invention includes a VTR 1, a memory 2, a signal processing unit 3, a harddisk (HD) device 4, a flexible disk (FD) device 5, a controller 6, a multiplexer 7, a modulator 8 and a mastering device 9. The VTR 1 temporarily records recording information R, such as music information and video information, to be recorded on the optical disk. The memory 2 stores contents information which will be described later in detail. The signal processing unit 3 conducts A/D-conversion onto audio and video information outputted by the VTR 1, compresses the resultant digital signal by MPEG system, for example, and multiplexes audio signal with video signal by time-division multiplexing, thereby outputting a multiplexed signal Sr. The signal processing unit 3 further outputs an access signal Sac, corresponding to access information Dac, on the basis of the time code Tt which corresponds to recording information R outputted by the VTR 1 and the contents information signal Si outputted by the memory 2. Access information Dac is used to access recording information R by the unit of partial recording information Pr. The harddisk device 4 temporarily stores the multiplexed signal Sr, and the flexible disk device 5 temporarily stores access information signal Sac. The controller 6 performs total control of the information recording apparatus 100. In addition, the controller 6 adds access information Dac to other information to be recorded with recording information Dac, thereby to produce additional information Da and outputs additional information signal Sa corresponding to the additional information Da. Further, the controller 6 outputs information selection signal Sc used for multiplexing the multiplexed signal Sr with the additional information signal Sa. The multiplexer 7 multiplexes the multiplexed signal Sr and the additional information signal Sa by the time-division multiplexing to output a complex signal Sap on the basis of the information selection signal Sc. The modulator 8 adds error correction code (ECC) such as reed-solomon code to the complex signal Sap and applies eight-to-fifteen modulation thereto, so as to produce a recording signal Sm. The mastering device 9 records the recording signal Sm on a stamper disk used for the manufacturing the optical disks.

Next, the operation of the information recording apparatus 100 will be described. Audio and video information temporarily recorded by the VTR 1 is A/D-converted by the signal processing unit 3, and is compressed according to MPEG system. Then, the compressed signal is time-division multiplexed to be the multiplexed signal Sr and is temporarily stored in the harddisk device 4. In parallel with this processing, the signal processing unit 3 generates access information Dac by referring to the contents information signal Si, which includes the start addresses of all partial recording information Pr and the classified categories of the partial recording information Pr, and the time code Tt supplied from the VTR 1. The contents information signal Si includes the categories and the start addresses of the partial recording information Pr which are inputted according to the description of the queue sheet ST and stored in the memory 2. Then, the signal processing unit 3 outputs the access information signal Sac which is temporarily stored in the FD device 5. The examples of the contents of the access information Dac will be described later. The above processing is executed for overall recording information R.

When the above processing is completed for overall recording information R, the controller 6 reads out the multiplexed signal Sr from the harddisk device 4 and reads out the access information signal Sac from the FD device 5. Then, the controller 6 adds the access information Dac to other information to be recorded with the recording information R to produce additional information Da, and outputs the additional information signal Sa corresponding to additional information Da. Thereafter, the multiplexed signal Sr is multiplexed in time-division manner with the additional information signal Sa to produce the complex signal Sap. Then, the error correction signal is added to the complex signal Sap, and then the complex signal Sap is modulated by the eight-to-fifteen modulation. Then, the disk recording signal Sm is recorded on the stamper disk by the mastering device 9. Using the stamper disk thus produced, replica disks to be sold as commercial optical disks may be manufactured according to the replication technique.

Figure 2:
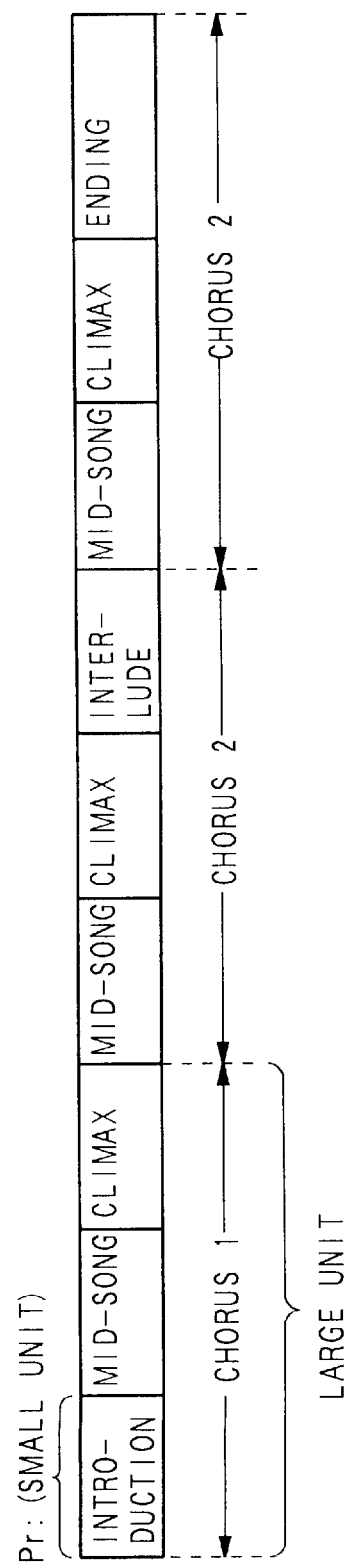
FIG. 2 shows a manner of classification of recorded information.

Next, the contents of access information Dac and the performance of the information recording apparatus 100 based on the access information Dac will be described with reference to FIGS. 2 to 6, by taking an example that recording information R include only audio information of a plural music songs. Normally, a music song includes a plurality of choruses as shown in FIG. 2, and a single chorus may be divided and classified into an introduction part, a middle song part, a climax part, an interlude part and an ending part. The numbers and orders of such parts in a single chorus are different from each other between different songs, however, such a classification may be commonly applicable to almost all kinds of songs. Each of these categories classified, i.e., the introduction part, the middle song part, the interlude part, etc., correspond to the classified category mentioned above, and FIG. 2 shows the contents of recording information R of a single song classified into a plurality of parts according to the above classification. The queue sheet ST describes the start time of each parts (i.e., partial recording information Pr) measured from the head of the song, and the memory 2 stores the classified category and the start time of each partial recording information Pr, as the contents information. In the following description, the partial recording information Pr will be referred to as "small unit", and the chorus shown in FIG. 2 will be referred to as "large unit".

The classified categories shown in FIG. 2 are applied with the category codes as shown in FIG. 3. As seen from FIG. 3, the category code "00h (h: hexadecimal number)" is not defined. This means, when the song is not classified into the category code of the song indicates "00h". The category codes "06h" to "FFh" are reserved for the future increase of the categories.

The signal processing unit 3 conducts the signal processing including the compression onto the audio information outputted from the VTR 1 for each of the small units, on the basis of the contents information for every small units stored in the memory 2. Then, the signal processing unit 3 calculates the start addresses of the small units based on the data quantity and the start times of the small units contained in the contents information Si, and stores the start addresses of the small units together with the classified categories included in the contents information signal Si. At this time, each of the small units are applied with the continuous number counted from the head of the audio information. Subsequently, the signal processing unit 3 refers to the contents information signal Si supplied from the memory 2, and determines small units of what categories constitute the large units (chorus in FIG. 2) and how is the order of the small units included in the large unit. Namely, in the case of FIG. 2, the signal processing unit 3 detects that the large unit corresponding to the chorus 1 includes three small units, i.e., an introduction part, a middle song part and a climax part, and that they appear in the order of the introduction part, the middle song part and the climax part. Thereafter, the signal processing unit 3 stores the combination of the small units constituting the large unit for each of the large units. In the above example, the signal processing unit 3 stores the combination of the introduction part, the middle song part and the climax part, and the order thereof. The large units are also applied with the continuous numbers counted from the head of the audio information. Then, the signal processing unit 3 performs the above described processing for all songs included in audio information outputted by the VTR 1, so as to generate access information Dac based on all data.

The data structure of access information Dac is shown in FIG. 4. As shown in FIG. 4, access information Dac includes data 20 indicating the total number of songs, data 21 indicating the total number of large units within each of the songs, data 22 indicating the total number of the small units within each of the large units, data 23 indicating the continuous number of the small unit counted from the head of the song, address data 24 indicating the start address of the small units and category code data 25 (see., FIG. 3) indicating the classified category of the small unit. In data 22, each of the large units are applied with the continuous number counted from the head of the audio information to be recorded.

Next, more detailed description will be given of access information Dac in line with the examples of songs, by referring to FIGS. 5 and 6. FIG. 5 shows the state in which audio information consist of two songs is classified into small units, corresponding to the partial recording information Pr, according to the classification described above. Namely, the first song consists of two large units, i.e., chorus 1 and chorus 2, and the first large unit consists of three small units, i.e., the introduction part, the middle song part and the climax part. The second large unit of the first song consists of the middle song part, the climax part and the ending part. The second song consists of a single large unit which consists of four small units, i.e., the introduction part, the middle song part, the climax part and the ending part. These classified categories of the small units are stored beforehand in the memory 2, as the contents information, on the basis of the description of the queue sheet ST. According to the contents information, the signal processing unit 3 generates access information Dac including the start addresses of the small units (i.e., "n1", "n2", . . . "n10" in FIG. 5).

FIG. 6 shows an example of the contents of access information Dac in correspondence with the classification shown in FIG. 5. In FIG. 6, data 20 indicate "2" because audio information shown in FIG. 5 include two songs. Data 21 indicate "2" and "1" because the first song includes two large units and the second song includes one large unit. Data 22 indicate "3", "3" and "4" because each of the three large units in FIG. 5 includes three, three and four small units, respectively. Data 23 represent the continuous numbers of the small units constituting the large units counted from the beginning of audio information. Start address data 24 describe the start addresses of the small units identified by the data 23 (see. FIG. 5). Category code data 25 describe the category codes of the respective small units.

By the above processing, the access signal Sac corresponding to access information Dac is produced and outputted by the signal processing unit 3. Then, the access signal Sac is temporarily stored in the FD device 5 and is then read out. The read-out signal is added to other necessary information by the controller 6, and is outputted as the additional information signal Sa. Thereafter, the multiplexer 7 multiplexes the multiplexed signal Sr with the additional information signal Sa, and the modulator 8 modulates and outputs the complex signal Sap which is then recorded on the stamper disk by the mastering device 9. Using the stamper disk, replica optical disks are manufactured.

The timing of the time-division multiplexing of the additional information signal Sa and the multiplexed signal Sr by the multiplexer 7 may be designed as follows. First, the switching terminal of the multiplexer 7 is connected to the controller 6 to receive the additional information signal Sa, and then the switching terminal is changed over to the harddisk device 4 to receive the multiplexed signal Sr, thereby recording additional information signal Sa at the innermost circumferential area of the optical disk (stamper disk). In this case, since the additional information signal Sa is recorded within a unique area, it is possible to quickly search for partial recording information Pr corresponding to the small units to be reproduced. Further, it is also possible to prevent the additional information signal Sa and the compressed multiplexed signal Sr from being reproduced together in a mixed state.

According to the information recording apparatus 100 and the optical disk on which audio information is recorded by the apparatus 100, contents information including the start addresses of the small units classified into the categories such as an introduction part, an interlude part or the like, and categories of the small units are recorded as well as audio information. Therefore, at the time of reproduction, desired portions corresponding to the small units may be reproduced, based on the contents information, regardless of the order according to which audio information is recorded on the optical disk.

(2) Information reproduction apparatus

Figure 7:
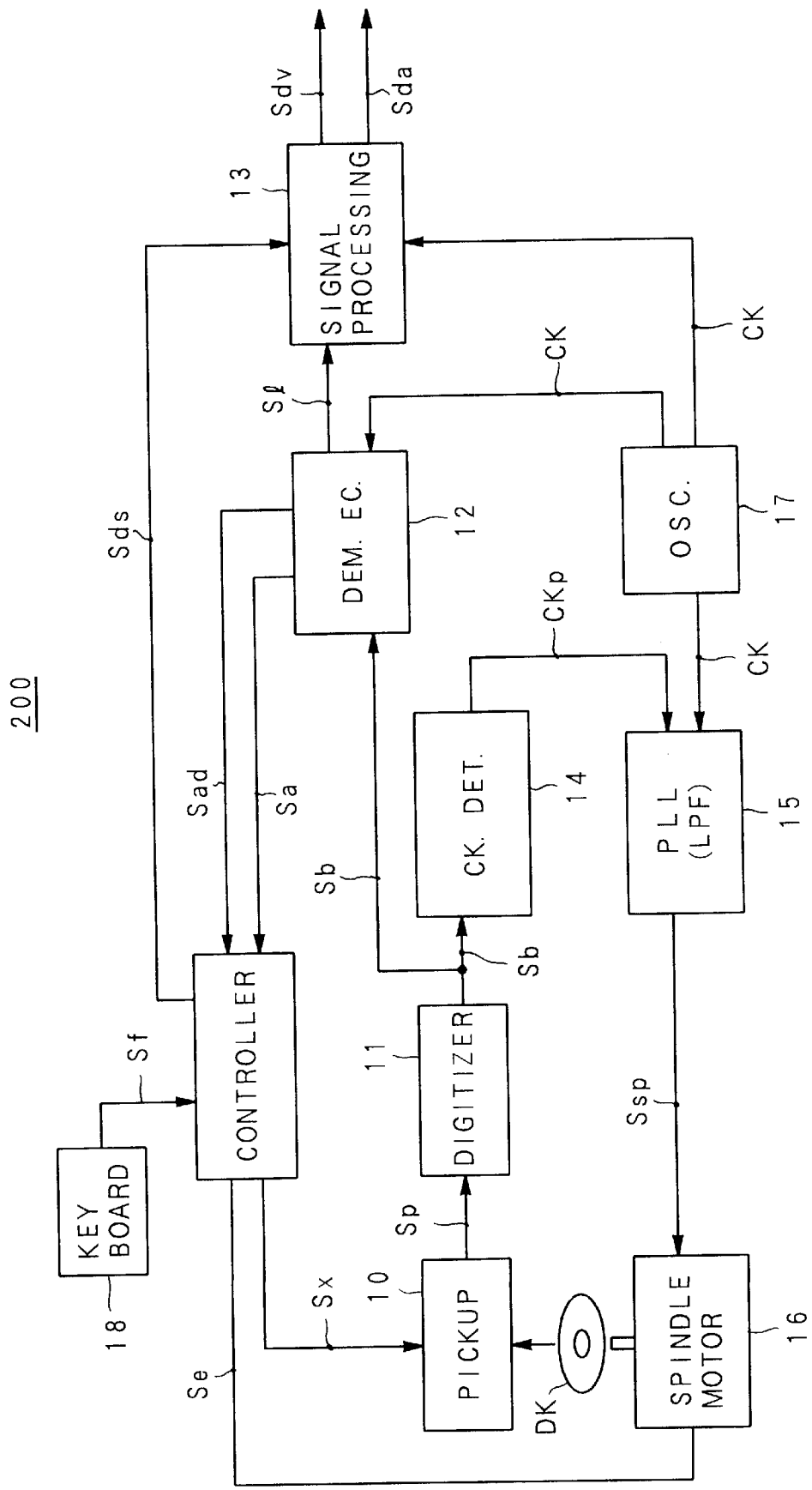
FIG. 7 is a block diagram illustrating the configuration of the information reproduction apparatus according to the present invention.

Next, an embodiment of the information reproduction apparatus according to the invention will be described with reference to FIGS. 7 to 8. First, the configuration of the information reproduction apparatus 200 will be described with reference to FIG. 7. As shown in FIG. 7, the information reproduction apparatus 200 includes an optical pickup 10, a digitizer 11, a demodulator 12, a signal processing unit 13, a clock detector 14, a phase comparator 15, a spindle motor 16, an oscillator 17, a keyboard 18 and a controller 19. The optical pickup 10 reads out the recording signal Sm from the optical disk DK on which information including additional information is recorded, and outputs the detection signal Sp. The digitizer 11 digitizes the detection signal Sp by using a given threshold to produce the binary signal Sb. The demodulator 12 conducts the demodulation and the error correction onto the binary signal Sb to output the demodulated signal Sl. In addition, the demodulator 12 extracts the additional information signal Sa from the binary signal Sb. The signal processing unit 13 expands the demodulated signal Sl according to MPEG system, and D/A-converts the expanded signal to output the video signal Sdv and the audio signal Sda. The clock detector 14 detects the clock component from the binary signal Sb, and outputs it as the detected clock signal CKp. The phase comparator 15 compares in phase the detected clock signal CKp with the reference clock signal CK outputted by the oscillator 17 to produce the comparison signal. The phase comparator 15 includes a low pass filter (LPF) for eliminating high frequency component from the comparison signal to output it as the rotation control signal Ssp. The spindle motor 16 rotates the optical disk DK under the rotation control based on the rotation control signal Ssp. The oscillator 17 outputs the reference clock CK used for the timing control of the respective components within the apparatus 200. The controller 19 performs total control of the components in the apparatus 200. In addition, the controller 19 stores the access information Dac included in the additional information signal Sa, and receives the designation signal Sf designating the classified category of recorded information from the keyboard 18 and the address signal Sad corresponding to the address of the currently-reproduced recorded information which is outputted by the demodulator 12. Then, the controller 19 outputs the spindle control signal Se, the output control signal Sds and the slider control signal Sx based on the designation signal Sf and the address signal Sad, so that only the partial recording information Pr corresponding to the category designated by the designation signal Sf is reproduced.

With respect to the switched output of the video signal Sdv and the audio signal Sda, the signal processing unit 13 continuously outputs the image just before the transfer of the pickup as the still image during the transfer of the optical pickup 10 to the next position corresponding to the partial recording information Pr to be reproduced subsequently. During the transfer of the pickup 10, the reproduction of the audio signal Sda is stopped. Further, in the reproduction by the apparatus 200, the recording signal Sm is recorded in such a manner that the clock component can be extracted from the recording signal Sm, and hence the clock detector 14 can detect the clock signal CKp.

Next, the operation of the information reproduction apparatus will be described with reference to FIGS. 7 and 8. Here, it is assumed that audio information is recorded on the optical disk DK in a manner shown in the example of access information Dac shown in FIG. 6. Therefore, in this case, the video signal Sdv is not outputted. However, even if the video information signal Sdv is multiplexed with audio information signal, the video information may be reproduced in a similar fashion. The following description is directed to the case where only the climax parts corresponding to the category code "03h" are reproduced.

Figure 8:
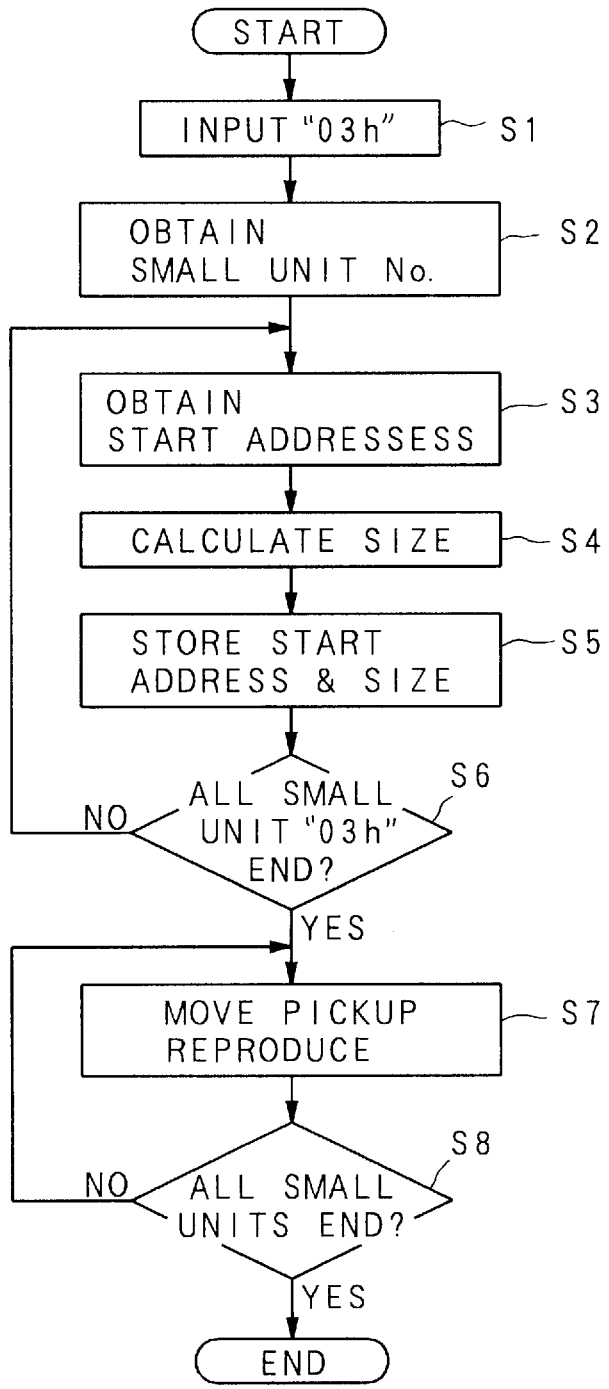
FIG. 8 is a flowchart illustrating the operation of the information reproduction apparatus.

The operation of the information reproduction apparatus 200 is controlled by the controller 19 in the manner shown the flowchart of FIG. 8. In the apparatus 200 shown in FIG. 7, when a user desires to reproduce audio information classified into a certain category, he or she inputs the category code corresponding to the desired category. In this example, the user inputs instruction by the keyboard 18 designating the category code "03h" corresponding to the climax part (step S1). When the category code is inputted, the controller 19 obtains data 23 indicating the numbers of the small units "No.3", "No.5", "No.9" each corresponding to the category code "03h" in category code data 25 in the access information Dac (see. FIG. 6) (step S2). When the numbers of the small units are obtained, then the controller 19 obtains the start address of first one of the small units thus obtained and the start address of the small unit subsequent to it from the address data 24 (step S3). Specifically, in this example, the controller 19 obtains the start address "n3" of the small unit No.3 and the start address "n4" of the small unit subsequent to the small unit No.3. Then, the controller 19 subtracts the start address "n3" from the address "n4" to calculate the size (n4−n3) of the small unit No.3 (step S4). Thereafter, the controller 19 stores, in the internal memory, the start address "n3" and the size of the small unit No.3 thus calculated (step S5).

Next, it is judged whether or not steps S3 to S5 are executed for all of the small units having the category code "03h", i.e., in this case the small units No.3, No.5 and No.9 (step S6). In the above description, only the processing for the small unit No.3 is completed, and therefore step S6 results in NO. In this case, the processing of steps S3 to S5 are executed for the small units No.5 and No.9. When the processing of steps S3 to S5 is executed for all small units (step S6:YES), then the controller 19 outputs the slider control signal Sx so as to transfer the optical pickup 10 to the position of the start address n3 of the small unit No.3. At this time, the output of the audio signal Sda is stopped in response to the output control signal Sds. Then, when the pickup 10 is transferred to the position of the address n3, the apparatus 200 starts reproduction of the audio signal from the address n3 for the data quantity corresponding to the size (n4−n3) of the small unit No.3 (step S7). The output of the audio signal Sda is started simultaneously with the start of the reproduction. When the audio signal is reproduced for the size of the small unit No.3, i.e., (n4−n3), it is judged whether or not step S7 is executed for all small units having the category code "03h" (step S8). In the extent of the above description, only the processing of step S7 is executed for the small unit No.3, and hence step S8 results in NO. Accordingly, the processing returns to step S7 to execute the processing for the small units No.6 and No.9. In this way, the processing of step S7 is executed for the small units Nos. 3, 6 and 9, so that audio signal of the small units corresponding to the climax part are reproduced. When all small units corresponding to the climax part are reproduced (step S8:YES), then the reproduction according to the category designation is terminated and the controller 19 takes the command-waiting status. The above is the operation of the information reproduction apparatus 200.

According to the information reproduction apparatus 200, the desired information is reproduced on the basis of the access information Dac which include the start address and the classified category of the small unit. Therefore, it is possible to successively reproduce only the desired parts of the song, e.g., the climax parts or the introduction parts of the respective songs. In this view, the utility of the apparatus may be particularly improved when applied to the karaoke device.

(3) Modifications

In the above description, a single song is classified into the small units of categories "introduction part", "climax part", "interlude part" or the like. However, the manner of classification may not be limited to this example. By altering the manner of classification, it is possible to repeatedly reproduce the same chorus or song, to successively reproduce the specific songs or to repeatedly reproduce the unit of identical category. Further, not only audio information but also video information may be divided into a plurality of units according to the classification and selectively reproduced by designating the category of the classification. Still further, this invention is applicable to CD-ROM for use with computers. In that case, data recorded on the CD-ROM may be divided into the units by the classification determined in consideration of the data contents. Still further, in recording information on the optical disk, the additional information signal Sa may be recorded at every files or songs. The keyboard 18 may be a remote controller.

What is claimed is:

1. A recording medium, comprising:
    a first area for recording an audio/video signal, the audio/video signal comprising a plurality of units each corresponding to a portion within a song, the audio/video signal including at least one of an audio signal and a video signal; and
    a second area for recording a contents information signal relating to the plurality of units, the contents information signal including relative position signals indicative of relative positions for specifically accessing the units within the song and including category signals indicative of categories of the units classified in a predetermined classification manner.

2. The medium according to claim 1, wherein the recording medium comprises an optical disk, and the second area is separated and independent from the first area.

3. The medium according to claim 2, wherein the first area is located at an innermost circumference of the optical disk.

4. The medium according to claim 1, wherein the category signals indicate at least one of an introduction portion, a mid-song portion, an interlude portion, a climax portion, and an ending portion of the song.

5. An information reproduction apparatus for reproducing signals from a recording medium having a first area for recording an audio/video signal, the audio/video signal including a plurality of units each corresponding to a portion within a song, the audio/video signal including at least one of an audio signal and a video signal, and a second area for recording a contents information signal relating to the plurality of units, the contents information signal including relative position signals indicative of relative positions for specifically accessing the units within the song and including category signals indicative of categories of the units classified in a predetermined classification manner, the information reproduction apparatus comprising:
    a reading device for reading the audio/video signal and the contents information signal from the recording medium;
    an extracting device for extracting the relative position signals and the category signals from the contents information signal;
    an instruction device for receiving an instruction which designates a classified category;
    a controller for detecting the units corresponding to the category designated by the instruction device by referring to the category signals and for detecting the relative position signals corresponding to the detected units; and
    a reproduction device for reproducing the units of a processed signal from a position detected by the controller.

6. The apparatus according to claim 5, wherein the recording medium comprises an optical disk, and the reading device reads out the contents information signal and the audio/video signal from different areas of the optical disk.

7. The apparatus according to claim 5, wherein the audio/video signal comprises an audio signal, and the category signal indicates at least one of an introduction portion, an interlude portion, a mid-song portion, a climax portion, and an ending portion of the song.

8. A recording medium for a karaoke reproducing apparatus, comprising:
    a first area for recording a signal processed by a predetermined signal processing, the signal comprising a plurality of first units each corresponding to a song, each of the first units including a plurality of second units each corresponding to a portion within the respective song; and
    a second area for recording a contents information signal relating to the plurality of first and second units, the contents information signal including relative position signals indicative of relative positions for specifically accessing the second units within the song corresponding to the first unit and including category signals indicative of categories of the second units classified in a predetermined classification manner.

9. The medium according to claim 8, wherein the category signals indicate at least one of an introduction portion, a mid-song portion, an interlude portion, a climax portion, and an ending portion of the song.

10. A recording medium, comprising:
    a plurality of first areas each for recording an audio/video signal comprising a plurality of units each corresponding to a portion within a song, the audio/video signal including at least one of an audio signal and a video signal; and
    a plurality of second areas each for recording a contents information signal relating to the plurality of units, the contents information signal including relative position signals indicative of relative positions for specifically accessing the units within the song and including category signals indicative of categories of the units classified in a predetermined classification manner, wherein the first areas and the second areas are alternatively formed on the recording medium such that the audio/video signal and the contents signal are recorded in a time-division multiplexed manner.

11. The medium according to claim 10, wherein the recording medium comprises an optical disk, and the second areas are separated and independent from the first areas.

12. The medium according to claim 10, wherein the category signals indicate at least one of an introduction portion, a mid-song portion, an interlude portion, a climax portion, and an ending portion of the song.

13. An information reproduction apparatus for reproducing signals from a recording medium having a plurality of first areas each for recording an audio/video signal, the audio/video signal including a plurality of units each corresponding to a portion within a song, the audio/video signal including at least one of an audio signal and a video signal, and a plurality of second areas each for recording a contents information signal relating to the plurality of units, the contents information signal including relative position signals indicative of relative positions for specifically accessing the units within the song and including category signals indicative of categories of the units classified in a predetermined classification manner, the first areas and the second areas being alternatively formed on the recording medium such that the audio/video signal and the contents signal are recorded in a time-division multiplexed manner, the information reproduction apparatus comprising:

a reading device for reading the audio/video signal and the contents information signal from the recording medium;

an extracting device for extracting the relative position signals and the category signals from the contents information signal;

an instruction device for receiving an instruction which designates a classified category;

a controller for detecting the units corresponding to the category designated by the instruction device by referring to the category signals and for detecting the relative position signals corresponding to the detected units; and a reproduction device for reproducing the units of processed signals from a position detected by the controller.

14. A recording medium for a karaoke reproducing apparatus, comprising:

a plurality of first areas each for recording a signal processed by a predetermined signal processing, the signal comprising a plurality of first units each corresponding a song, each of the first units including a plurality of second units each corresponding to a portion within the respective song; and a plurality of second areas each for recording a contents information signal relating to the plurality of first and second units, the contents information signal including relative position signals indicative of relative positions for specifically accessing the second units within the song corresponding to the first unit and including category signals indicative of categories of the second units classified in a predetermined classification manner.

15. The medium according to claim 14, wherein the category signals indicates at least one of an introduction portion, a mid-song portion, and interlude portion, a climax portion, and an ending portion of the song.

16. A recording medium, comprising:

a first area having recorded thereon an audio/video signal, the audio/video signal comprising a plurality of units each corresponding to a portion within a song, the audio/video signal including at least one of an audio signal and a video signal; and a second area having recorded thereon a contents information signal relating to the plurality of units, the contents information signal including relative position signals indicative of relative positions for specifically accessing the unit within the song and including category signals indicative of categories of the units classified in a predetermined classification manner.

17. A recording medium for a karaoke reproducing apparatus, comprising:

a first area having recorded thereon a signal processed by a predetermined signal processing, the signal comprising a plurality of first units each corresponding to a song, each of the first units including a plurality of second units each corresponding to a portion within the respective song; and a second area having recorded thereon a contents information signal relating to the plurality of first and second units, the contents information signal including relative position signals indicative of relative positions for specifically accessing the second units within the song corresponding to the first unit and including category signals indicative of categories of the second units classified in a predetermined classification manner.

18. A recording medium, comprising:

a plurality of first areas each having recorded thereon an audio/video signal comprising a plurality of units each corresponding to a portion within a song, the audio/video signal including at least one of an audio signal and a video signal; and a plurality of second areas each having recorded thereon a contents information signal relating to the plurality of units, the contents information signal including relative position signals indicative of relative positions for specifically accessing the units within the song and including category signals indicative of categories of the units classified in a predetermined classification manner, wherein the first areas and the second areas are alternatively formed on the recording medium such that the audio/video signal and the contents signal are recorded in a time-division multiplexed manner.

19. A recording medium for a karaoke reproducing apparatus, comprising:

a plurality of first areas each having recorded thereon a signal processed by a predetermined signal processing, the signal comprising a plurality of first units each corresponding a song, each of the first units including a plurality of second units each corresponding to a portion within the respective song; and a plurality of second areas each having recorded thereon a contents information signal relating to the plurality of first and second units, the contents information signal including relative position signals indicative of relative positions for specifically accessing the second units within the song corresponding to the first unit and including category signals indicative of categories of the second units classified in a predetermined classification manner.

\* \* \* \* \*